(12) United States Patent
Nam et al.

(10) Patent No.: US 11,917,526 B2
(45) Date of Patent: Feb. 27, 2024

(54) SYSTEM INFORMATION UPDATE OPTIMIZATION

(71) Applicant: QUALCOMM Incorporated, San Diego, CA (US)

(72) Inventors: Wooseok Nam, San Diego, CA (US); Tao Luo, San Diego, CA (US); Peter Gaal, San Diego, CA (US); Linhai He, San Diego, CA (US); Wanshi Chen, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 17/304,612

(22) Filed: Jun. 23, 2021

(65) Prior Publication Data

US 2021/0410047 A1 Dec. 30, 2021

Related U.S. Application Data

(60) Provisional application No. 63/043,334, filed on Jun. 24, 2020.

(51) Int. Cl.
*H04W 48/12* (2009.01)
*H04W 8/22* (2009.01)

(52) U.S. Cl.
CPC ............ *H04W 48/12* (2013.01); *H04W 8/22* (2013.01)

(58) Field of Classification Search
None
See application file for complete search history.

(56) References Cited

U.S. PATENT DOCUMENTS

| | | | |
|---|---|---|---|
| 2006/0035634 A1* | 2/2006 | Swann | H04W 48/12 455/425 |
| 2010/0034094 A1* | 2/2010 | Tenny | H04W 8/22 455/67.7 |
| 2017/0105166 A1* | 4/2017 | Lee | H04W 48/12 |
| 2019/0223145 A1* | 7/2019 | Jung | H04W 76/10 |

\* cited by examiner

*Primary Examiner* — Jinsong Hu
*Assistant Examiner* — Alexander J Yi
(74) *Attorney, Agent, or Firm* — Harrity & Harrity, LLP

(57) ABSTRACT

Various aspects of the present disclosure generally relate to wireless communication. In some aspects, a user equipment (UE) may receive a system information message including first system information for the UE; receive, after receiving the system information message, a system information update message indicating a change to at least a portion of the first system information; determine whether the change applies to one or more capabilities of the UE; and selectively acquire second system information based at least in part on whether the change applies to the one or more capabilities of the UE. Numerous other aspects are provided.

27 Claims, 5 Drawing Sheets

SYSTEM INFORMATION UPDATE OPTIMIZATION

CROSS-REFERENCE TO RELATED APPLICATION

This patent application claims priority to U.S. Provisional Patent Application No. 63/043,334, filed on Jun. 24, 2020, entitled "SYSTEM INFORMATION UPDATE OPTIMIZATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for system information update optimization.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. NR, which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving a system information message including first system information for the UE; receiving, after receiving the system information message, a system information update message indicating a change to at least a portion of the first system information; determining whether the change applies to one or more capabilities of the UE; and selectively acquiring second system information based at least in part on whether the change applies to the one or more capabilities of the UE.

In some aspects, a user equipment for wireless communication includes a memory and one or more processors coupled to the memory, the memory and the one or more processors configured to receive a system information message including first system information for the UE; receive, after receiving the system information message, a system information update message indicating a change to at least a portion of the first system information; determine whether the change applies to one or more capabilities of the UE; and selectively acquire second system information based at least in part on whether the change applies to the one or more capabilities of the UE.

In some aspects, a non-transitory computer-readable medium storing one or more instructions for wireless communication includes one or more instructions that, when executed by one or more processors of a user equipment, cause the one or more processors to receive a system information message including first system information for the UE; receive, after receiving the system information message, a system information update message indicating a change to at least a portion of the first system information; determine whether the change applies to one or more capabilities of the UE; and selectively acquire second system information based at least in part on whether the change applies to the one or more capabilities of the UE.

In some aspects, an apparatus for wireless communication includes means for receiving a system information message including first system information for the apparatus; means for receiving, after receiving the system information message, a system information update message indicating a change to at least a portion of the first system information; means for determining whether the change applies to one or more capabilities of the apparatus; and means for selectively acquiring second system information based at least in part on whether the change applies to the one or more capabilities of the apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
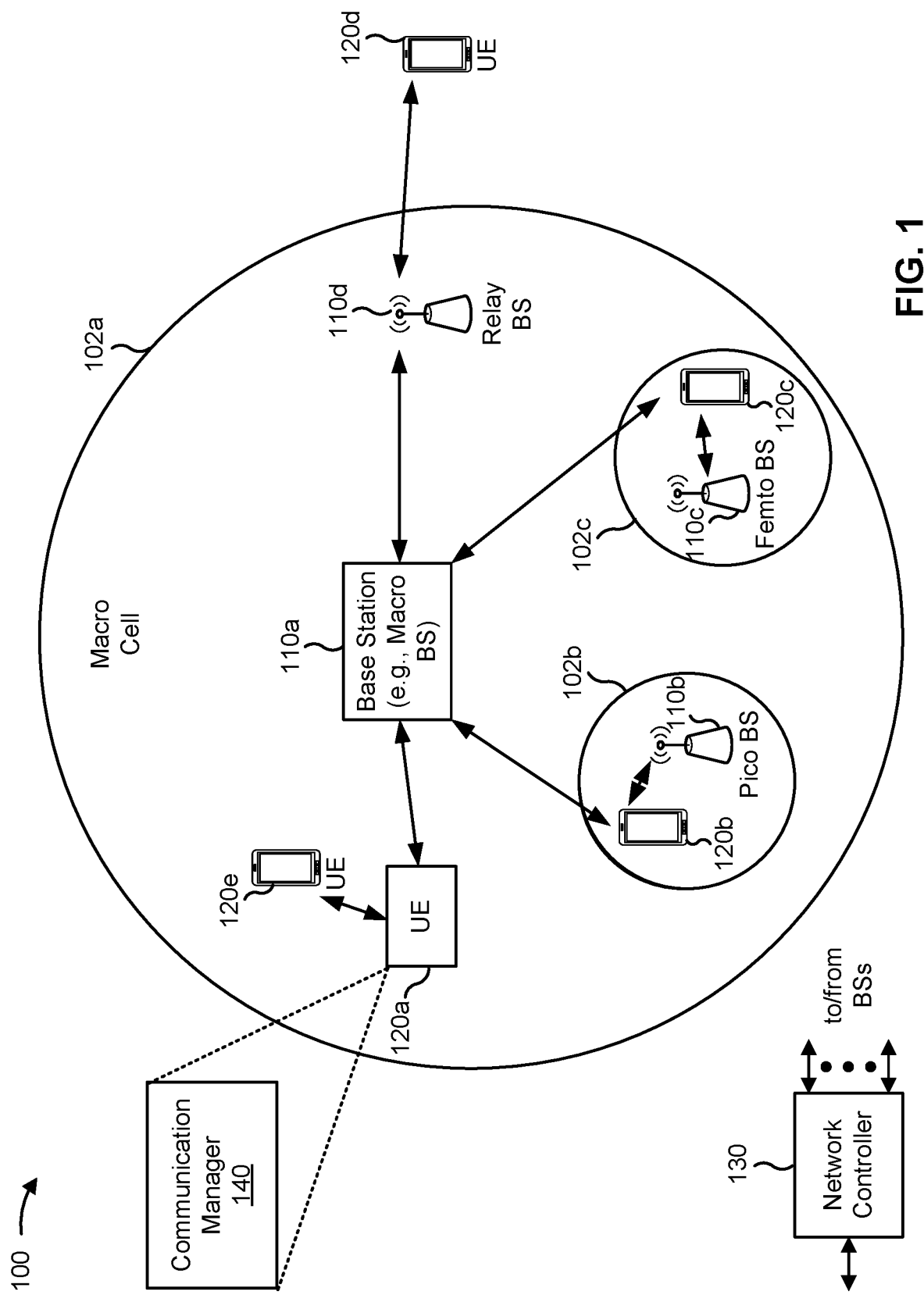
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive a system information message including first system information for the UE; receive, after receiving the system information message, a system information update message indicating a change to at least a portion of the first system information; determine whether the change applies to one or more capabilities of the UE; and selectively acquire second system information based at least in part on whether the change applies to the one or more capabilities of the UE. Additionally, or alternatively, the communication manager 140 may perform one or more other operations described herein.

As indicated above, FIG. 1 is provided as an example Other examples may differ from what is described with regard to FIG. 1.

Figure 2:
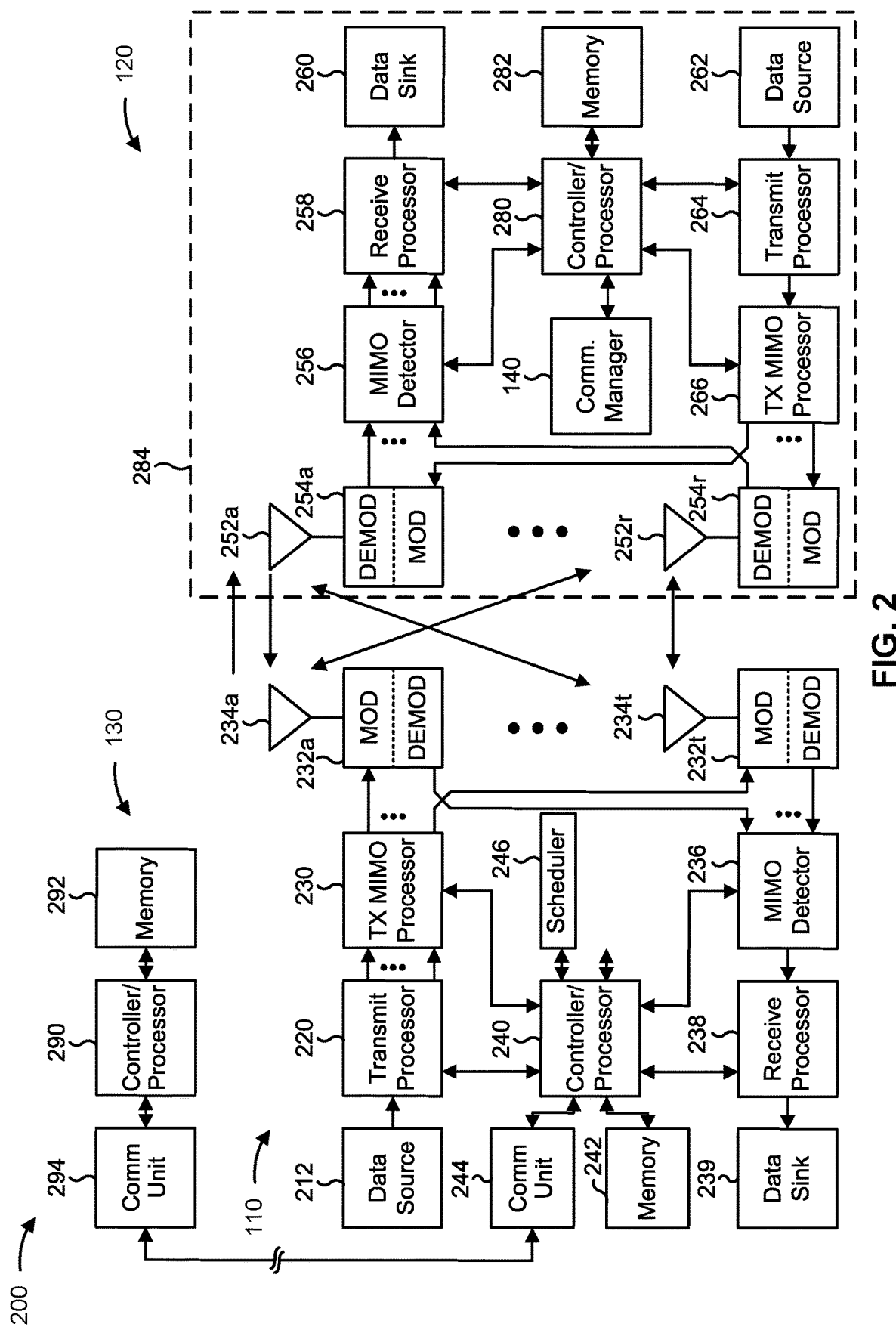
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The UE 120 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-4).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-4).

The controller/processor 240 of the base station 110, the controller/processor 280 of the UE 120, and/or any other component(s) of FIG. 2 may perform one or more techniques associated with system information update optimization, as described in more detail elsewhere herein. For example, the controller/processor 240 of the base station 110, the controller/processor 280 of the UE 120, and/or any other component(s) of FIG. 2 may perform or direct operations of, for example, process 400 of FIG. 4 and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4 and/or other processes as described herein. In some examples, executing instructions may include running the instructions, converting the instructions, compiling the instructions, and/or interpreting the instructions, among other examples.

In some aspects, a UE (e.g., the UE 120) includes means for receiving a system information message including first system information for the UE; means for receiving, after receiving the system information message, a system information update message indicating a change to at least a portion of the first system information; means for determining whether the change applies to one or more capabilities of the UE; and/or means for selectively acquiring second system information based at least in part on whether the change applies to the one or more capabilities of the UE. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example Other examples may differ from what is described with regard to FIG. 2.

In some communications systems, a base station may broadcast system information to UEs in a cell. For example, the base station may transmit a master information block (MIB) on a physical broadcast channel (PBCH). Additionally, or alternatively, the base station may transmit a system information block (SIB) (e.g., SIB type-1 (SIB1) conveying remaining minimum system information (RMSI)) on a downlink control information (DCI)-scheduled physical downlink shared channel (PDSCH) scrambled using a system information (SI) radio network temporary identifier (RNTI). After the UE acquires system information for a cell, by receiving the MIB and/or the SIB, the UE may not re-acquire system information until the system information is updated.

To update system information, a base station may transmit an indication to UEs of a cell requesting that the UEs communicate with the base station to re-acquire the system information. In other words, a UE with first system information may communicate with the base station to acquire second system information that is an update to the first system information. In this case, the base station may transmit a short message, such as a DCI with a paging RNTI (P-RNTI), which the UE may receive and may determine to communicate with the base station to re-acquire the system information.

System information may include information enabling the UE to establish a connection to a network, monitor the network, and/or the like. For example, the system information may include information identifying a configuration of a set of paging channels, identifying a configuration of a set of random access procedures, identifying a set of neighboring cells, and/or the like. However, as new features are deployed in a network for new types of UEs, the system information may include information identifying additional configurations, such as a configuration for a two-step random access channel (RACH) procedure, a configuration or a power-efficient paging procedure, a configuration of resources for a particular service (e.g., a V2X service, an MTC service, a reduced capability (RedCap) service, a satellite service, etc.), and/or the like.

However, legacy types of UEs may not be compatible with some of the new features. For example, a first type of UE (e.g., a non-legacy UE) may be capable of using the power-efficient paging procedure, but a second type of UE (e.g., a legacy UE) may not be capable of using the power-efficient paging procedure. Moreover, some of the new features may update more frequently than other, legacy types of features. For example, a power-efficient paging procedure may be updated based at least in part on a cell condition, which may result in relatively frequent system information updates. As a result, frequent re-acquisition of system information may result in excessive utilization of network resources, excessive utilization of power resources, and/or the like by UEs that are not capable of using the features based at least in part on which a system information update is triggered.

Some aspects described herein enable system information update optimization. For example, a UE may parse a system information update message to identify a set of UE capabilities for which the system information update message pertains. In this case, the system information update message may include an indicator indicating that a parameter of the system information that is being updated is related to, for example, a power-efficient paging procedure. As a result, in this example, if the UE has a capability for using a power-efficient paging procedure, the UE may re-acquire system information. In contrast, if the UE does not have a capability for using, for example, a power-efficient paging procedure, the UE may forgo re-acquiring system information, and may continue to use prior system information, which is unchanged with respect to aspects of the system information that the UE is capable of using. In this way, the UE avoids unnecessary utilization of power resources and avoids excessive utilization of network resources associated with unnecessary re-acquisition of system information.

Figure 3:
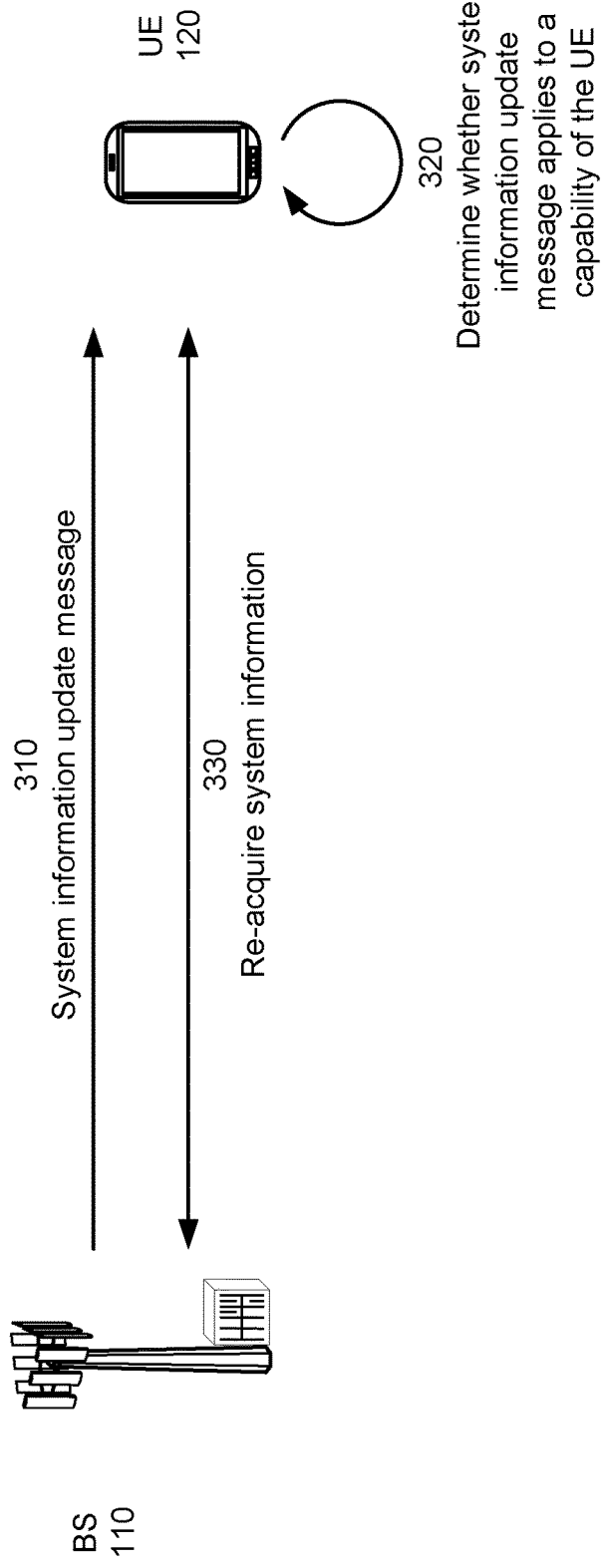
FIG. 3 is a diagram illustrating an example associated with system information update optimization, in accordance with the present disclosure.

FIG. 3 is a diagram illustrating an example 300 associated with system information update optimization, in accordance with the present disclosure. As shown in FIG. 3, example 300 includes communication between a base station 110 and a UE 120. In some aspects, the base station 110 and the UE 120 may be included in a wireless network such as wireless network 100. The base station 110 and the UE 120 may communicate on a wireless access link, which may include an uplink and a downlink.

As further shown in FIG. 3, and by reference number 310, UE 120 may receive a system information update message. For example, UE 120 may acquire first system information from base station 110 and may, at a later time, receive the system information update message that may indicate that UE 120 is to acquire second system information to update one or more parameters of the first system information.

In some aspects, UE 120 may receive, from base station 110, a short message, as shown, indicating a system information update. For example, UE 120 may receive a short message that includes one or more bit indicators to indicate for which UE capabilities a parameter of the first system information is to change in the second information. In this case, the bit indicator may indicate a version of UE, a version of BS, a specification, and/or the like for which at least one feature, or a set of features, thereof has a parameter update.

Additionally, or alternatively, UE 120 may receive DCI indicating a system information update. For example, UE 120 may receive a dedicated format of DCI with one or more fields indicating one or more capabilities, feature sets, UE versions, and/or the like for which at least one feature, or a set of features, thereof has a parameter update. In this case, the DCI may be associated with the same RNTI as for, for example, a short message (e.g., a P-RNTI). Additionally, or alternatively, the DCI may be associated with a different RNTI. For example, UE 120 may receive DCI associated with an RNTI that indicates the DCI is for a partial system information update (e.g., a system information update for parameters relating to a subset of features).

As further shown in FIG. 3, and by reference number 320, UE 120 may determine whether the system information update message applies to a capability of UE 120. For example, based at least in part on receiving the system information update message, UE 120 may determine whether the system information update message indicates a change to at least one capability of UE 120. In some aspects, UE 120 may determine that the system information update message relates to UE 120. For example, UE 120 may determine, based at least in part on a bit indicator, a DCI field, an RNTI type, and/or the like, that the system information update message is directed to UEs with a particular capability and may determine that UE 120 has the particular capability. In this case, UE 120 may determine to re-acquire system information to update parameters for the particular capability. Additionally, or alternatively, UE 120 may determine, based at least in part on the system information update message, that UE 120 is not configured for a capability for which a parameter is to be updated and may determine to refrain from re-acquiring system information. Additionally, or alternatively, when UE 120 is a legacy type of UE, based at least in part on a format or a RNTI of the system information update message, UE 120 may not be capable of decoding or identifying the system information update message and may, as a result, refrain from re-acquiring system information.

As further shown in FIG. 3, and by reference number 330, UE 120 may re-acquire system information. For example, based at least in part on determining that the system information update message applies to at least one capability of UE 120, UE 120 may communicate with base station 110 to re-acquire system information. In this case, UE 120 may acquire second system information and may use the second system information for monitoring a network, establishing a connection, performing one or more procedures, as described above, and/or the like. In another example, when UE 120 determines to refrain from re-acquiring system information, UE 120 may continue using the first system information for monitoring the network, establishing a connection, performing one or more procedures, and/or the like.

As indicated above, FIG. 3 is provided as an example Other examples may differ from what is described with respect to FIG. 3.

Figure 4:
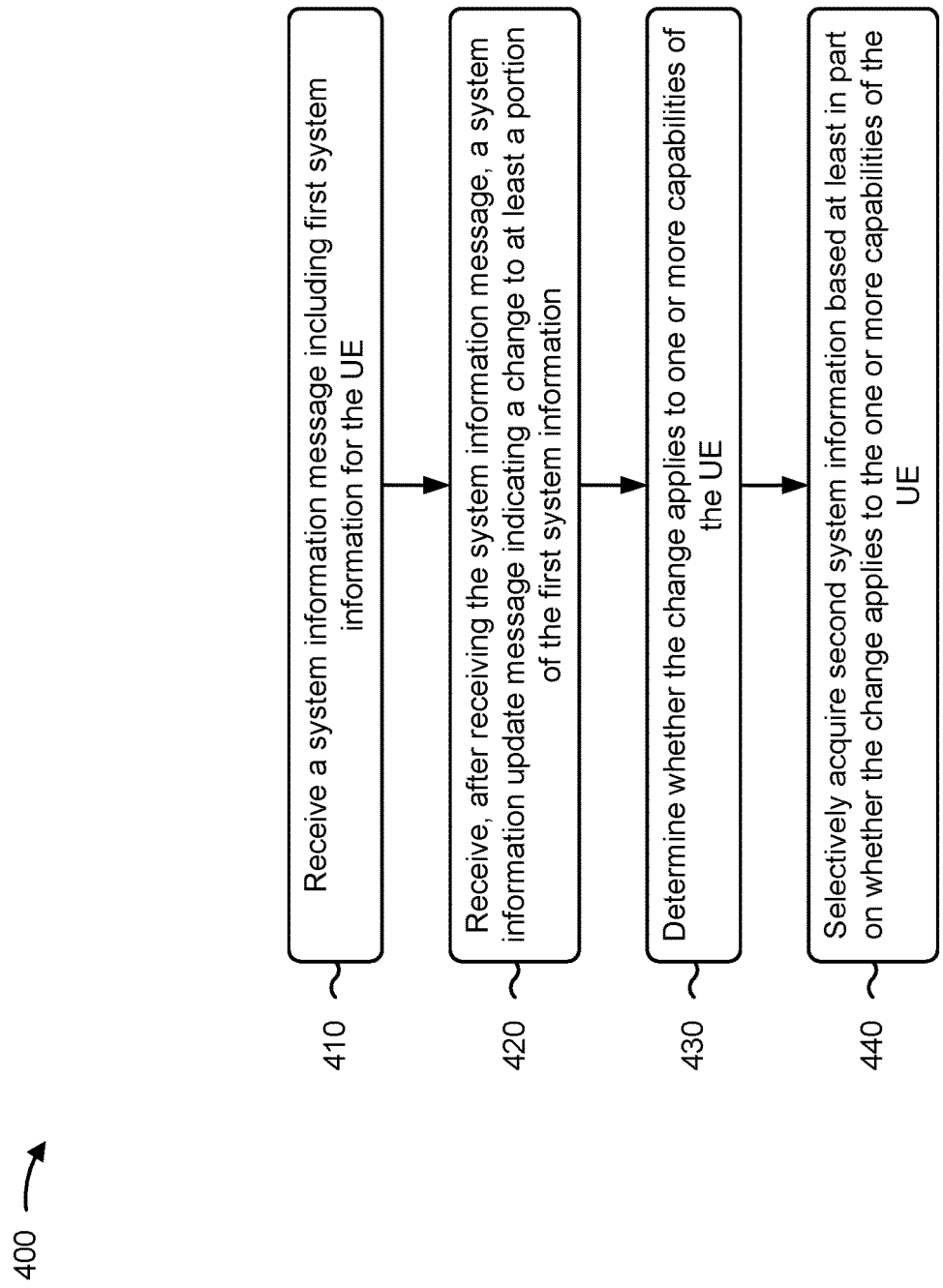
FIG. 4 is a diagram illustrating an example process associated with system information update optimization, in accordance with the present disclosure.

FIG. 4 is a diagram illustrating an example process 400 performed, for example, by a UE, in accordance with the present disclosure. Example process 400 is an example where the UE (e.g., UE 120 and/or the like) performs operations associated with system information update optimization.

As shown in FIG. 4, in some aspects, process 400 may include receiving a system information message including first system information for the UE (block 410). For example, the UE (e.g., using receive processor 258, transmit processor 264, controller/processor 280, memory 282, and/or the like) may receive a system information message including first system information for the UE, as described above.

As further shown in FIG. 4, in some aspects, process 400 may include receiving, after receiving the system information message, a system information update message indicating a change to at least a portion of the first system information (block 420). For example, the UE (e.g., using receive processor 258, transmit processor 264, controller/processor 280, memory 282, and/or the like) may receive, after receiving the system information message, a system information update message indicating a change to at least a portion of the first system information, as described above.

As further shown in FIG. 4, in some aspects, process 400 may include determining whether the change applies to one or more capabilities of the UE (block 430). For example, the UE (e.g., using receive processor 258, transmit processor 264, controller/processor 280, memory 282, and/or the like) may determine whether the change applies to one or more capabilities of the UE, as described above.

As further shown in FIG. 4, in some aspects, process 400 may include selectively acquiring second system information based at least in part on whether the change applies to the one or more capabilities of the UE (block 440). For example, the UE (e.g., using receive processor 258, transmit processor 264, controller/processor 280, memory 282, and/or the like) may selectively acquire second system information based at least in part on whether the change applies to the one or more capabilities of the UE, as described above.

Process 400 may include additional aspects, such as any single aspect or any combination of aspects described below and/or in connection with one or more other processes described elsewhere herein.

In a first aspect, the system information update message includes one or more bit indicators indicating whether the change applies to the one or more capabilities of the UE.

In a second aspect, alone or in combination with the first aspect, the system information update message is included in a downlink control information.

In a third aspect, alone or in combination with one or more of the first and second aspects, a format of the downlink control information indicates whether the change applies to the one or more capabilities of the UE.

In a fourth aspect, alone or in combination with one or more of the first through third aspects, a radio network temporary identifier of the downlink control information indicates whether the change applies to the one or more capabilities of the UE.

In a fifth aspect, alone or in combination with one or more of the first through fourth aspects, determining whether the change applies to the one or more capabilities of the UE includes determining that the change to the at least the portion of the first system information applies to the one or more capabilities of the UE, and selectively acquiring the second system information includes acquiring the second system information.

In a sixth aspect, alone or in combination with one or more of the first through fifth aspects, determining whether the change applies to the one or more capabilities of the UE comprises: determining that the change to the at least the portion of the first system information does not apply to the one or more capabilities of the UE, and selectively acquiring the second system information comprises: forgoing acquiring the second system information.

In a seventh aspect, alone or in combination with one or more of the first through sixth aspects, selectively acquiring the second system information includes communicating with a base station to acquire the second system information.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
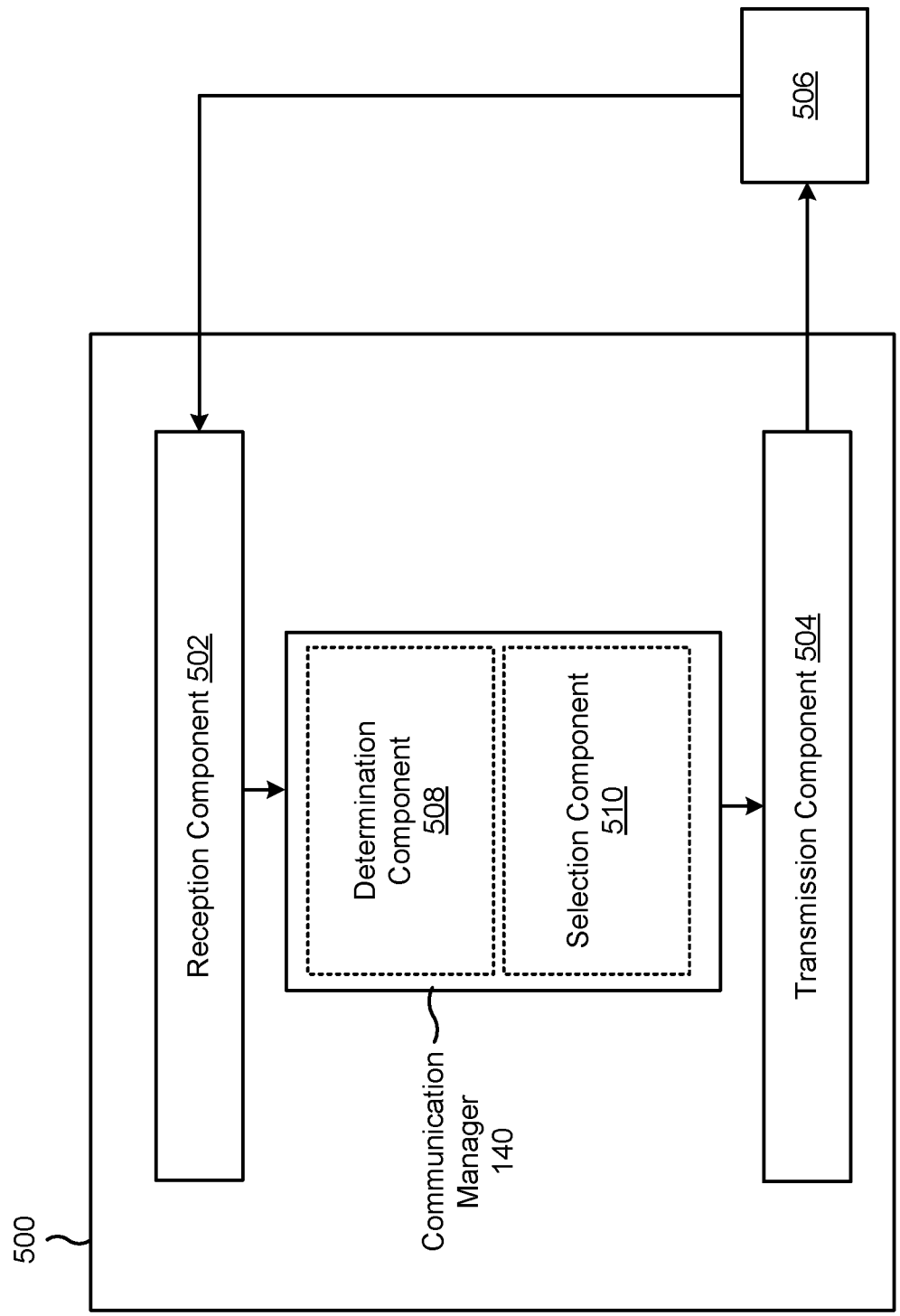
FIG. 5 is a diagram of an example apparatus for wireless communication, in accordance with the present disclosure.

FIG. 5 is a diagram of an example apparatus 500 for wireless communication. The apparatus 500 may be a UE, or a UE may include the apparatus 500. In some aspects, the apparatus 500 includes a reception component 502 and a transmission component 504, which may be in communication with one another (for example, via one or more buses and/or one or more other components). As shown, the apparatus 500 may communicate with another apparatus 506 (such as a UE, a base station, or another wireless communication device) using the reception component 502 and the transmission component 504. As further shown, the apparatus 500 may include the communication manager 140. The communication manager 140 may include one or more of a determination component 508 or a selection component 510, among other examples.

In some aspects, the apparatus 500 may be configured to perform one or more operations described herein in connection with FIG. 3. Additionally, or alternatively, the apparatus 500 may be configured to perform one or more processes described herein, such as process 400 of FIG. 4. In some aspects, the apparatus 500 and/or one or more components shown in FIG. 5 may include one or more components of the UE described in connection with FIG. 2. Additionally, or alternatively, one or more components shown in FIG. 5 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 502 may receive communications, such as reference signals, control information, data communications, or a combination thereof, from the apparatus 506. The reception component 502 may provide received communications to one or more other components of the apparatus 500. In some aspects, the reception component 502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 506. In some aspects, the reception component 502 may include one or more antennas, a modem, a demodulator, a MIMO detector, a receive processor, a controller/processor, a memory, or a combination thereof, of the UE described in connection with FIG. 2.

The transmission component 504 may transmit communications, such as reference signals, control information, data communications, or a combination thereof, to the apparatus 506. In some aspects, one or more other components of the apparatus 506 may generate communications and may provide the generated communications to the transmission component 504 for transmission to the apparatus 506. In some aspects, the transmission component 504 may perform signal processing on the generated communications (such as filtering, amplification, modulation, digital-to-analog conversion, multiplexing, interleaving, mapping, or encoding, among other examples), and may transmit the processed signals to the apparatus 506. In some aspects, the transmission component 504 may include one or more antennas, a modem, a modulator, a transmit MIMO processor, a transmit processor, a controller/processor, a memory, or a combination thereof, of the UE described in connection with FIG. 2. In some aspects, the transmission component 504 may be co-located with the reception component 502 in a transceiver.

The reception component 502 may receive a system information message including first system information for the UE. The reception component 502 may receive, after receiving the system information message, a system information update message indicating a change to at least a portion of the first system information. The determination component 508 may determine whether the change applies to one or more capabilities of the UE. The selection component 510 may selectively acquire second system information based at least in part on whether the change applies to the one or more capabilities of the UE. The reception component 502 or the transmission component 504 may communicate with a base station to acquire the second system information.

The number and arrangement of components shown in FIG. 5 are provided as an example. In practice, there may be additional components, fewer components, different components, or differently arranged components than those shown in FIG. 5. Furthermore, two or more components shown in FIG. 5 may be implemented within a single component, or a single component shown in FIG. 5 may be implemented as multiple, distributed components. Additionally, or alternatively, a set of (one or more) components shown in FIG. 5 may perform one or more functions described as being performed by another set of components shown in FIG. 5.

The following provides an overview of some Aspects of the present disclosure:

Aspect 1: A method of wireless communication performed by a user equipment (UE), comprising: receiving a system information message including first system information for the UE; receiving, after receiving the system information message, a system information update message indicating a change to at least a portion of the first system information; determining whether the change applies to one or more capabilities of the UE; and selectively acquiring second system information based at least in part on whether the change applies to the one or more capabilities of the UE.

Aspect 2: The method of Aspect 1, wherein the system information update message includes one or more bit indicators indicating whether the change applies to the one or more capabilities of the UE.

Aspect 3: The method of any of Aspects 1 to 2, wherein the system information update message is included in a downlink control information.

Aspect 4: The method of Aspect 3, wherein a format of the downlink control information indicates whether the change applies to the one or more capabilities of the UE.

Aspect 5: The method of Aspect 3, wherein a radio network temporary identifier of the downlink control information indicates whether the change applies to the one or more capabilities of the UE.

Aspect 6: The method of any of Aspects 1 to 5, wherein determining whether the change applies to the one or more capabilities of the UE comprises: determining that the change to the at least the portion of the first system information applies to the one or more capabilities of the UE; wherein selectively acquiring the second system information comprises: acquiring the second system information.

Aspect 7: The method of any of Aspects 1 to 6, wherein determining whether the change applies to the one or more capabilities of the UE comprises: determining that the change to the at least the portion of the first system information does not apply to the one or more capabilities of the UE; wherein selectively acquiring the second system information comprises: forgoing acquiring the second system information.

Aspect 8: The method of any of Aspects 1 to 7, wherein selectively acquiring the second system information includes communicating with a base station to acquire the second system information.

Aspect 9: An apparatus for wireless communication at a device, comprising a processor; memory coupled with the processor; and instructions stored in the memory and executable by the processor to cause the apparatus to perform the method of one or more of Aspects 1-8.

Aspect 10: A device for wireless communication, comprising a memory and one or more processors coupled to the memory, the one or more processors configured to perform the method of one or more of Aspects 1-8.

Aspect 11: An apparatus for wireless communication, comprising at least one means for performing the method of one or more of Aspects 1-8.

Aspect 12: A non-transitory computer-readable medium storing code for wireless communication, the code comprising instructions executable by a processor to perform the method of one or more of Aspects 1-8.

Aspect 13: A non-transitory computer-readable medium storing a set of instructions for wireless communication, the set of instructions comprising one or more instructions that, when executed by one or more processors of a device, cause the device to perform the method of one or more of Aspects 1-8.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and one or more processors, coupled to the one or more memories, the one or more processors configured to:
   receive a system information message including first system information for the UE;
   receive a system information update message indicating at least a portion of the first system information is to change in second system information, the system information update message including a plurality of indicators, each indicator of the plurality of indicators corresponding to a feature set of a plurality of feature sets, and each feature set of the plurality of feature sets associated with a different wireless communication specification version and relating to at least one parameter corresponding to a set of UE capabilities associated with one or more wireless communication systems, wherein each indicator of the plurality of indicators indicates whether system information for the corresponding feature set is changed;
   determine whether one or more indicators of the plurality of indicators corresponds to feature sets supported by one or more capabilities of the UE; and
   selectively acquire the second system information corresponding to the supported feature sets of the UE in response to the one or more indicators of the plurality of indicators indicating a change to the system information for the corresponding supported feature sets.

2. The UE of claim 1, wherein the plurality of indicators are bit indicators.

3. The UE of claim 1, wherein the system information update message is included in a downlink control information.

4. The UE of claim 3, wherein a format of the downlink control information indicates whether the change applies to the one or more capabilities of the UE.

5. The UE of claim 3, wherein a radio network temporary identifier of the downlink control information indicates whether the change applies to the one or more capabilities of the UE.

6. The UE of claim 1, wherein the one or more processors are further configured to:
   forgo acquiring the second system information in response to the one or more indicators of the plurality of indicators indicating no changes to the system information for the corresponding supported feature sets.

7. The UE of claim 1, wherein the one or more processors, to selectively acquire the second system information, are configured to:
   communicate with a network entity to acquire the second system information.

8. A method of wireless communication performed by a user equipment (UE), comprising:
   receiving a system information message including first system information for the UE;
   receiving a system information update message indicating at least a portion of the first system information is to change in second system information, the system information update message including a plurality of indicators, each indicator of the plurality of indicators corresponding to a feature set of a plurality of feature sets, and each feature set of the plurality of feature sets associated with a different wireless communication specification version and relating to at least one parameter corresponding to a set of UE capabilities associated with one or more wireless communication systems, wherein each indicator of the plurality of indicators indicates whether system information for the corresponding feature set is changed;
   determining whether one or more indicators of the plurality of indicators corresponds to feature sets supported by [to] one or more capabilities of the UE; and
   selectively acquiring the second system information corresponding to the supported feature sets of the UE in response to the one or more indicators of the plurality of indicators indicating a change to the system information for the corresponding supported feature sets.

9. The method of claim 8, wherein the plurality of indicators are bit indicators.

10. The method, of claim 8, wherein the system information update message is included in a downlink control information.

11. The method of claim 10, wherein a format of the downlink control information indicates whether the change applies to the one or more capabilities of the UE.

12. The method of claim 10, wherein a radio network temporary identifier of the downlink control information indicates whether the change applies to the one or more capabilities of the UE.

13. The method of claim 8, further comprising:
   forgoing acquiring the second system information in response to the one or more indicators of the plurality of indicators indicating no changes to the system information for the corresponding supported feature sets.

14. The method of claim 8, wherein selectively acquiring the second system information comprises:
   communicating with a network entity to acquire the second system information.

15. A non-transitory computer-readable medium storing a set of instructions for wireless communication, the set of instructions comprising:

one or more instructions that, when executed by one or more processors of a user equipment (UE), cause the UE to:

receive a system information message including first system information for the UE;

receive a system information update message indicating at least a portion of the first system information is to change in second system information, the system information update message including a plurality of indicators, each indicator of the plurality of indicators corresponding to a feature set of a plurality of feature sets. and each feature set of the plurality of feature sets associated with a different wireless communication specification version and relating to at least one parameter corresponding to a set of UE capabilities associated with one or more wireless communication systems, wherein each indicator of the plurality of indicators indicates whether system information for the corresponding feature set is changed;

determine whether one or more indicators of the plurality of indicators corresponds to feature sets supported by one or more capabilities of the UE; and selectively acquire the second system information corresponding to the supported feature sets of the UE in response to the one or more indicators of the plurality of indicators indicating a change to the system information for the corresponding supported feature sets.

16. The non-transitory computer-readable medium of claim 15, wherein the plurality of indicators are.

17. The non-transitory computer-readable medium of claim 15, wherein the system information update message is included in a downlink control information.

18. The non-transitory computer-readable medium of claim 17, wherein a format of the downlink control information indicates whether the, change applies to the one or more capabilities of the UE.

19. The non-transitory computer-readable medium of claim 17, wherein a radio network temporary identifier of the downlink control information indicates whether the change applies to the one or more capabilities of the UE.

20. The non-transitory computer-readable medium of claim 17, wherein the one or more instructions, further cause the UE to:

forgo acquiring the second system information in response to the one or more indicators of the plurality of indicators indicating no changes to the system information for the corresponding supported feature sets.

21. The non-transitory computer-readable medium of claim 15, wherein the one or more instructions, that cause the UE to selectively acquire the second system information, cause the UE to:

communicate with a network entity to acquire the second system information.

22. An apparatus for wireless communication, comprising:

means for receiving a system information message including first system information for the apparatus:

means for receiving a system information update message indicating at least a portion of the first system information is to change in second system information, the system information update message including a plurality of indicators, each indicator of the plurality of indicators corresponding to a feature set of a plurality of feature sets, and each feature set of the plurality of feature sets associated with a different wireless communication specification version and relating to at least one parameter corresponding to a set of UE capabilities associated with one or more wireless communication systems, wherein each indicator of the plurality of indicators indicates whether system information for the corresponding feature set is changed;

means for determining whether one or more indicators of the plurality of indicators corresponds to feature sets supported by one or more capabilities of the apparatus; and means for selectively acquiring the second system information corresponding to the supported feature sets of the apparatus in response to the one or more indicators of the plurality of indicators indicating a change to the system information for the corresponding supported feature sets.

23. The apparatus of claim 22, wherein the plurality of indicators are bit indicators.

24. The apparatus of claim 22, wherein the system information update message is included in a downlink control information.

25. The apparatus of claim 24, wherein a format of the downlink control information indicates whether the change applies to the one or more capabilities of the apparatus.

26. The apparatus of claim 24, wherein a radio network temporary identifier of the downlink control information indicates whether the change applies to the one or more capabilities of the apparatus.

27. The apparatus of claim 22, wherein the means for determining whether the system information update message indicates a change to the one or more capabilities of the apparatus comprises:

means for determining that the system information update message indicates a change to the one or more capabilities of the apparatus; and wherein the means for selectively acquiring the second system information comprises:

means for acquiring the second system information.

\* \* \* \* \*